(12) United States Patent
Jawaji et al.

(10) Patent No.: US 12,067,022 B2
(45) Date of Patent: *Aug. 20, 2024

(54) PROCESSING QUERIES AND COMMANDS USING A UNIVERSAL INTELLI-SHELL INSTRUMENT

(71) Applicant: Bank of America Corporation, Charlotte, NC (US)

(72) Inventors: Maheshwari Jawaji, Hyderabad (IN); Thangaraju Nachimuthu, Chennai (IN); Gandi Venkata RamaKrishna, Hyderabad (IN); Devulapalli Venkata Lakshmi Sai Siva Kumar, Hyderabad (IN); Sivasankar Sivasalam, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,675

(22) Filed: Apr. 28, 2023

(65) Prior Publication Data

US 2023/0259514 A1 Aug. 17, 2023

Related U.S. Application Data

(63) Continuation of application No. 17/665,329, filed on Feb. 4, 2022, now Pat. No. 11,693,869.

(51) Int. Cl.
*G06F 7/00* (2006.01)
*G06F 16/248* (2019.01)
(Continued)

(52) U.S. Cl.
CPC .......... *G06F 16/248* (2019.01); *G06F 16/258* (2019.01); *G06N 20/00* (2019.01)

(58) Field of Classification Search
CPC .. G06F 16/248; G06F 16/258; G06F 16/4393; G06F 16/3329; G06F 9/4843;
(Continued)

(56) References Cited

U.S. PATENT DOCUMENTS 7,400,421 B2 * 7/2008 Endo .................. H04N 1/00132
358/468
8,194,646 B2 6/2012 Elliott et al.
(Continued)

FOREIGN PATENT DOCUMENTS

| CN | 105064816 A | 11/2015 |
| CN | 204862938 U | 12/2015 |

(Continued)

OTHER PUBLICATIONS

Feb. 22, 2023—(US) Notice of Allowance—U.S. Appl. No. 17/665,329.

*Primary Examiner* — Mohammad A Sana
(74) *Attorney, Agent, or Firm* — Banner & Witcoff, Ltd.

(57) ABSTRACT

Aspects of the disclosure relate to processing queries and commands. A computing platform may receive a command input configured in a first format. The computing platform may input the command input into a natural syntactic language processor configured to extract parameters from the command input. The computing platform may input the command input into a decision system configured to identify a command type of the command input. The computing platform may generate, using a mapping catalogue and based on the parameters and the command type, an output command formatted in a second format. The computing platform may execute, against a binary store configured in the second format, the output command to obtain results to the command input. The computing platform may send
(Continued)

commands directing an enterprise user device to display the results, which may cause the enterprise user device to display the results.

20 Claims, 8 Drawing Sheets

(51) Int. Cl.
*G06F 16/25* (2019.01)
*G06N 20/00* (2019.01)

(58) Field of Classification Search
CPC .... G06F 9/5055; G06F 9/5027; G06F 9/5077; G06F 21/31; G06F 21/6245; G06N 20/00
See application file for complete search history.

(56) References Cited

U.S. PATENT DOCUMENTS

| | | | |
|---|---|---|---|
| 8,676,833 B2 | 3/2014 | Chunilal | |
| 8,812,620 B2 | 8/2014 | Reisman | |
| 8,898,722 B2 | 11/2014 | Reisman | |
| 9,336,327 B2 | 5/2016 | Melnik et al. | |
| 9,589,022 B2 | 3/2017 | Devarao | |
| 9,684,495 B2 | 6/2017 | Adler | |
| 9,852,178 B2 | 12/2017 | Devarao | |
| 9,852,179 B2 | 12/2017 | Devarao | |
| 9,994,229 B2 | 6/2018 | Ricci | |
| 10,210,203 B2 | 2/2019 | Brette et al. | |
| 10,778,439 B2 | 9/2020 | Cheng et al. | |
| 10,819,692 B2 | 10/2020 | Leblond et al. | |
| 10,915,525 B2 | 2/2021 | Devarao | |
| 11,023,461 B2 | 6/2021 | Rumiantsau et al. | |
| 11,693,869 B1 * | 7/2023 | Jawaji | G06N 20/00 707/722 |
| 2005/0257053 A1 * | 11/2005 | Genty | G06F 21/31 713/167 |
| 2015/0052169 A1 * | 2/2015 | Ojima | H04N 21/47217 707/769 |
| 2020/0280619 A1 * | 9/2020 | Ko | H04L 12/2816 |

FOREIGN PATENT DOCUMENTS

| | | |
|---|---|---|
| CN | 206294027 U | 6/2017 |
| CN | 105122243 B | 2/2019 |
| KR | 102147926 B1 | 8/2020 |
| RU | 2546606 C2 | 4/2015 |

\* cited by examiner

PROCESSING QUERIES AND COMMANDS USING A UNIVERSAL INTELLI-SHELL INSTRUMENT

CROSS REFERENCE TO RELATED APPLICATIONS

This application is a continuation of and claims priority to co-pending U.S. application Ser. No. 17/655,329, filed Feb. 4, 2022, and entitled "Processing Queries and Commands Using a Universal Intellishell Instrument," which is incorporated herein by reference in its entirety.

BACKGROUND

Aspects of the disclosure relate to computing hardware and software, particularly distributed computing hardware and software configured for query and/or command translation. In some instances, enterprise users may connect to an operating system or a database instance, and may interact with a technology specific interface, such as an operating system shell, or an interactive command line interface for database management systems. Each of these shell interfaces may have different commands, which may make interaction difficult. Particularly, there may be a steep learning curve for an individual attempting to interact with a plurality of these interfaces. Accordingly, it may be important to improve user accessibility to these various interfaces while minimizing the learning curve for access.

SUMMARY

Aspects of the disclosure provide effective, efficient, scalable, and convenient technical solutions that address and overcome the technical problems associated with processing queries and commands. In accordance with one or more embodiments of the disclosure, a computing platform comprising at least one processor, a communication interface, and memory storing computer-readable instructions may receive, from an enterprise user device, a command input configured in a first format. The computing platform may input the command input into a natural syntactic language processor configured to extract one or more parameters from the command input. The computing platform may input the command input into a decision system configured to identify a command type of the command input. The computing platform may generate, using a mapping catalogue and based on the one or more parameters and the command type, an output command formatted in a second format. The computing platform may execute, against a binary store configured in the second format, the output command to obtain results to the command input. The computing platform may send one or more commands directing the enterprise user device to display the results, which may cause the enterprise user device to display the results.

In one or more instances, the command input may be one of: a database command or an operating system (OS) command. In one or more instances, the computing platform may train the natural syntactic language processor by training a supervised machine learning model using a plurality of natural language commands for a database and an operating system.

In one or more examples, the computing platform may train the decision system using unsupervised learning. In one or more examples, the mapping catalogue may include relationships between parameters, command types, and output commands.

In one or more instances, the first format may be a first machine language and the second format may be a second machine language. In one or more instances, the first format may be a natural language and the second format may be a machine language.

In one or more examples, the computing platform may receive, from the enterprise user device, feedback indicating whether the output command is accurate based on the command input. The computing platform may update, based on the feedback, one or more of: the natural syntactic language processor and the decision system.

In one or more instances, the one or more parameters may be one or more of: parts of speech, named entities, basic dependencies, and enhanced dependencies. In one or more instances, the decision system may identify the command type of the command input by inputting the one or more parameters into a clustering model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
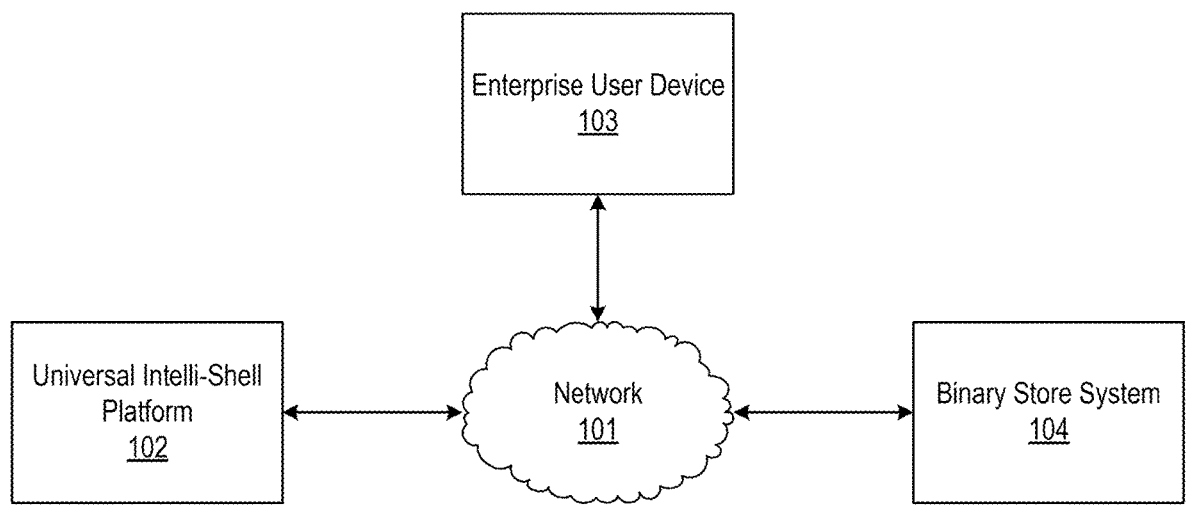
FIGS. 1A-1B depict an illustrative computing environment configured to improve query and/or command processing in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to improved query and command processing. In some instances, enterprise users connecting to an operating system or a database instance may interact with a specific technology specific interface such as a shell or power shell for an operating system or a SQL based interactive command line interface for database management systems such as Oracle, SQL server, MySQL, Sybase, and/or other management systems.

Each of these shell interfaces may have different commands, which may make them difficult for user interaction.

For example, there may be a steep learning curve if someone were to interact with all these command line interfaces (e.g., because they may be familiar with programming or otherwise drafting inputs in one or more programming or natural languages, but not others).

There is not currently a common universal command line interface that can interact at the operating system level and database level across multiple relational database management systems. Accordingly, described herein is an interactive and batch query instrument for catalogue connection using natural language parsing (NLP). A natural syntactic language processor may process the commands to generate a parse tree. A decision system may connect to the mapping catalogue based on the technology and an appropriate binary store may be invoked to serve a user's request.

In addition to NLP, the systems described herein may make use of supervised and un-supervised languages to make decisions. The system may include the following features: 1) a decision engine and natural language processor may leverage supervised and un-supervised languages; 2) a binary store with all binaries needed to process user commands; 3) a pluggable utility that may be integrated with any technical product; 4) port-ability features that may enable plug and play across a universal technology stack and remove any dependency on underlying technology; and 5) reduction in time needed to technically upskill the team while forming a crowd-sourced horizontal operations model. Accordingly, a decisions system is described herein that may leverage un-supervised learning and may determine to invoke an appropriate binary store.

These and other features are described in further detail below.

Figure 1B:
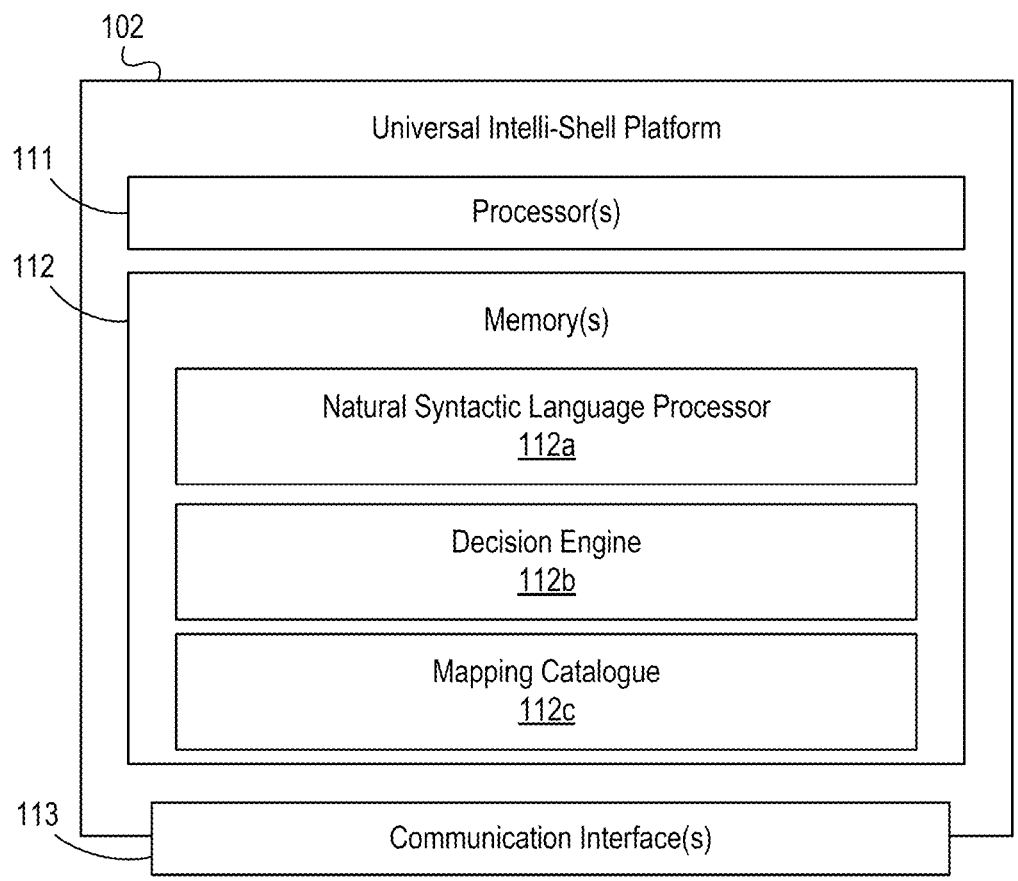

FIGS. 1A-1B depict an illustrative computing environment that provides improved query and command processing in accordance with one or more example embodiments. Referring to FIG. 1A, computing environment 100 may include one or more computer systems. For example, computing environment 100 may include universal intelli-shell platform 102, enterprise user device 103, and binary store system 104.

As described further below, universal intelli-shell platform 102 may be a computer system that includes one or more computing devices (e.g., servers, server blades, or the like) and/or other computer components (e.g., processors, memories, communication interfaces) that may be used to process queries and commands as described further below. In these instances, the universal intelli-shell platform 102 may be configured to train, host, and/or otherwise maintain one or more machine learning models that may be used to identify query/command parameters and type, convert the queries/commands to a target dialect, and execute the queries/commands accordingly.

Enterprise user device 103 may be and/or otherwise include one or more devices such as a laptop computer, desktop computer, mobile device, tablet, smartphone, and/or other device that may be used by an individual to input commands/queries for processing. In some instances, the enterprise user device 103 may be configured to receive commands/queries in one or more machine languages and/or natural languages, and may be configured to communicate with the universal intelli-shell platform 102 to resolve such commands/queries. In some instances, enterprise user device 103 may be configured to display one or more user interfaces (e.g., results of the queries/commands, or the like). Although a single enterprise user device 103 is shown, any number of such devices may be deployed in the systems/methods described below without departing from the scope of the disclosure.

Binary store system 104 may be and/or otherwise include one or more computing devices (e.g., servers, server blades, and/or other devices) and/or other computer components (e.g., processors, memories, communication interfaces) that may be used in command/query processing. For example, binary store system 104 may be configured to receive commands/queries, formatted in a format corresponding to the binary store system 104, and to return results accordingly. In some instances, the binary store system 104 may store information formatted in one or more formats. In instances where the binary store system 104 includes information formatted only in a single format, additional binary store systems may be included on the network 101, which may, e.g., each be formatted in a different format.

Computing environment 100 also may include one or more networks, which may interconnect universal intelli-shell platform 102, enterprise user device 103, and/or binary store system 104. For example, computing environment 100 may include a network 101 (which may interconnect, e.g., universal intelli-shell platform 102, enterprise user device 103, and/or binary store system 104).

In one or more arrangements, universal intelli-shell platform 102, enterprise user device 103, and/or binary store system 104 may be any type of computing device capable of sending and/or receiving requests and processing the requests accordingly. For example, universal intelli-shell platform 102, enterprise user device 103, binary store system 104, and/or the other systems included in computing environment 100 may, in some instances, be and/or include server computers, desktop computers, laptop computers, tablet computers, smart phones, and/or other devices that may include one or more processors, memories, communication interfaces, storage devices, and/or other components. As noted above, and as illustrated in greater detail below, any and/or all of universal intelli-shell platform 102, enterprise user device 103, binary store system 104, in some instances, be special-purpose computing devices configured to perform specific functions.

Referring to FIG. 1B, universal intelli-shell platform 102 may include one or more processors 111, memory 112, and communication interface 113. A data bus may interconnect processor 111, memory 112, and communication interface 113. Communication interface 113 may be a network interface configured to support communication between universal intelli-shell platform 102 and one or more networks (e.g., network 101, or the like). Memory 112 may include one or more program modules having instructions that when executed by processor 111 cause universal intelli-shell platform 102 to perform one or more functions described herein and/or one or more databases that may store and/or otherwise maintain information which may be used by such program modules and/or processor 111. In some instances, the one or more program modules and/or databases may be stored by and/or maintained in different memory units of universal intelli-shell platform 102 and/or by different computing devices that may form and/or otherwise make up universal intelli-shell platform 102. For example, memory 112 may have, host, store, and/or include natural syntactic language processor 112a, decision engine 112b, and/or mapping catalogue 112c.

Natural syntactic language processor 112a may be or include one or more supervised learning models that may be configured to extract one or more parameters from input queries/commands, as discussed in greater detail below.

Decision engine 112b may be or include one or more unsupervised learning models that be configured to identify a type of query/command received (e.g., database, operating system, and/or other) based on the extracted parameters, as discussed in greater detail below. Mapping catalogue 112c may include one or more models/rules that may be used to transform the received query/command from a source dialect to a target dialect for execution on the binary store system based on the type of query/command and the parameters.

Figure 2A:
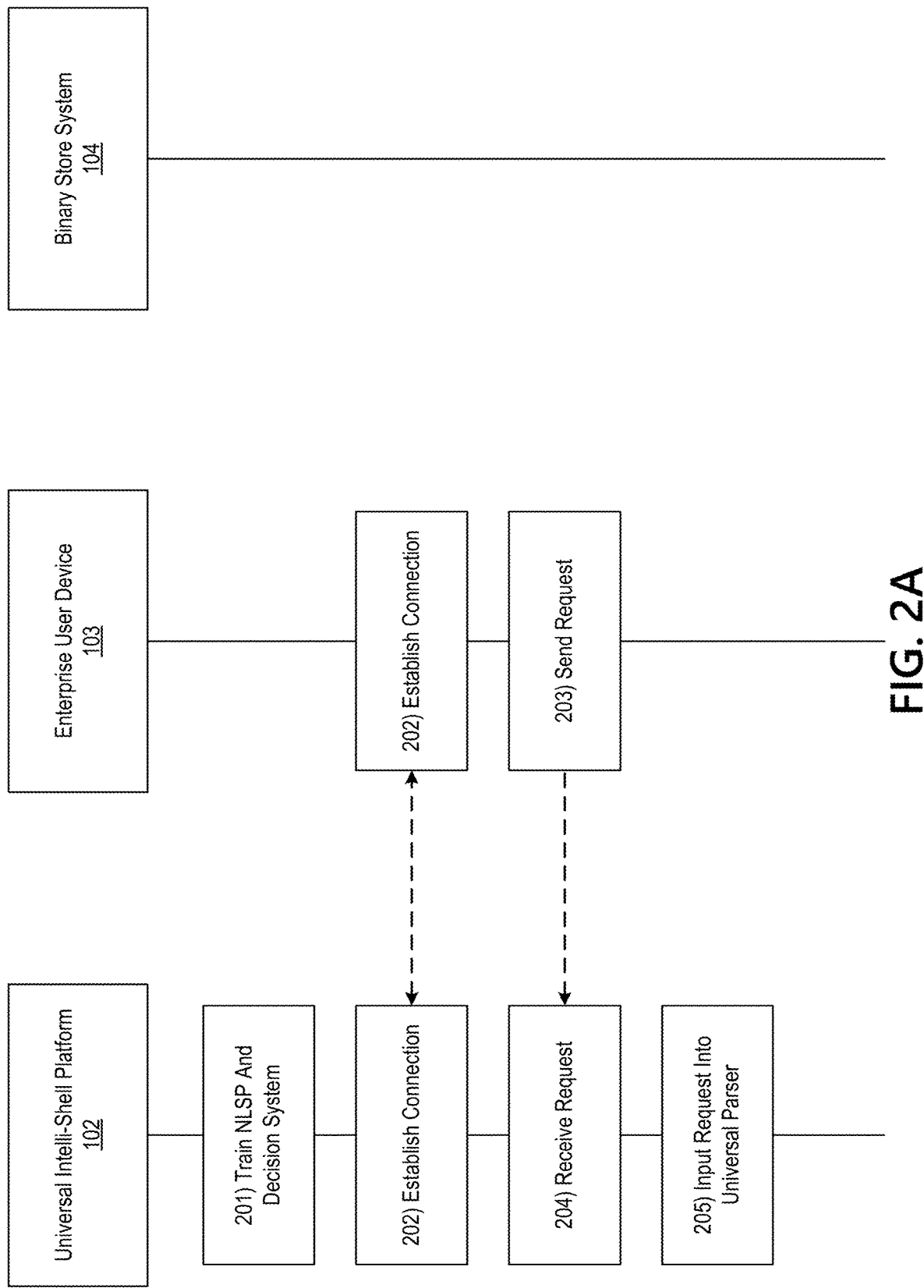
FIGS. 2A-2D depict an illustrative event sequence for improved query and/or command processing in accordance with one or more example embodiments.

FIGS. 2A-2D depict an illustrative event sequence for improved query/command processing in accordance with one or more example embodiments. Referring to FIG. 2A, at step 201, the universal intelli-shell platform 102 may train the natural syntactic language processor 112a and the decision engine 112b. For example, in training the natural syntactic language processor 112a, the universal intelli-shell platform 102 may use one or more labelled datasets to train a supervised learning model to identify and extract parameters (e.g., parts of speech, named entities, basic dependencies, enhanced dependencies, and/or other parameters) from queries/commands. In training the supervised learning model to identify parts of speech, the universal intelli-shell platform 102 may train the natural syntactic language processor 112a to distinguish words based on their syntactic functions (e.g., noun, pronoun, adjective, determiner, verb, adverb, preposition, conjunction, interjection, and/or other functions). In training the supervised learning model to identify named entities, the universal intelli-shell platform 102 may train the natural syntactic language processor 112a to identify organizations, individuals, and/or other named entities. In training the supervised learning model to identify basic and enhanced dependencies, the universal intelli-shell platform 102 may train the natural syntactic language processor 112a to identify relations between words in the queries/commands where a first word is a governor and a second word is dependent on its relationship to the first word. For example, the universal intelli-shell platform 102 may use labelled datasets that include queries/commands, and their corresponding parameters may be labelled. In doing so, the universal intelli-shell platform 102 may train the natural syntactic language processor 112a to identify syntax and/or semantics of the queries/commands. In some instances, in training the natural syntactic language processor 112a, the universal intelli-shell platform 102 may train one or more of: an artificial neural network, a decision tree model, a nearest neighbor model, a support vector machine model, and/or other supervised learning models. In some instances, in training the natural syntactic language processor 112a, the universal intelli-shell platform 102 may use natural language commands and/or machine language commands for a plurality of databases and/or operating systems, which may, e.g., be labelled based on their parameters.

With regard to the decision engine 112b, the universal intelli-shell platform 102 may train one or more unsupervised learning models. For example, in training the decision engine 112b, the universal intelli-shell platform 102 may use one or more unlabeled datasets to train an unsupervised learning model to identify a type of query/command received (e.g., operating system, database, and/or other) based on the parts of speech extracted by the natural syntactic language processor 112a. To do so, the universal intelli-shell platform 102 may train one or more of: a clustering model, logical regression model, and/or other unsupervised learning model. For example, the universal intelli-shell platform 102 may input a plurality of database commands/queries, operating system commands/queries, and/or other requests to train the decision engine 112b.

At step 202, the enterprise user device 103 may establish a connection with the universal intelli-shell platform 102. For example, the enterprise user device 103 may establish a first wireless data connection with the universal intelli-shell platform 102 to link the enterprise user device 103 to the universal intelli-shell platform 102 (e.g., in preparation for sending queries, commands, and/or other requests). In some instances, the enterprise user device 103 may identify whether a connection is already established with the universal intelli-shell platform 102. If a connection is already established, the enterprise user device 103 might not re-establish the connection. If a connection is not yet established, the enterprise user device 103 may establish the first wireless data connection as described herein.

Figure 4:
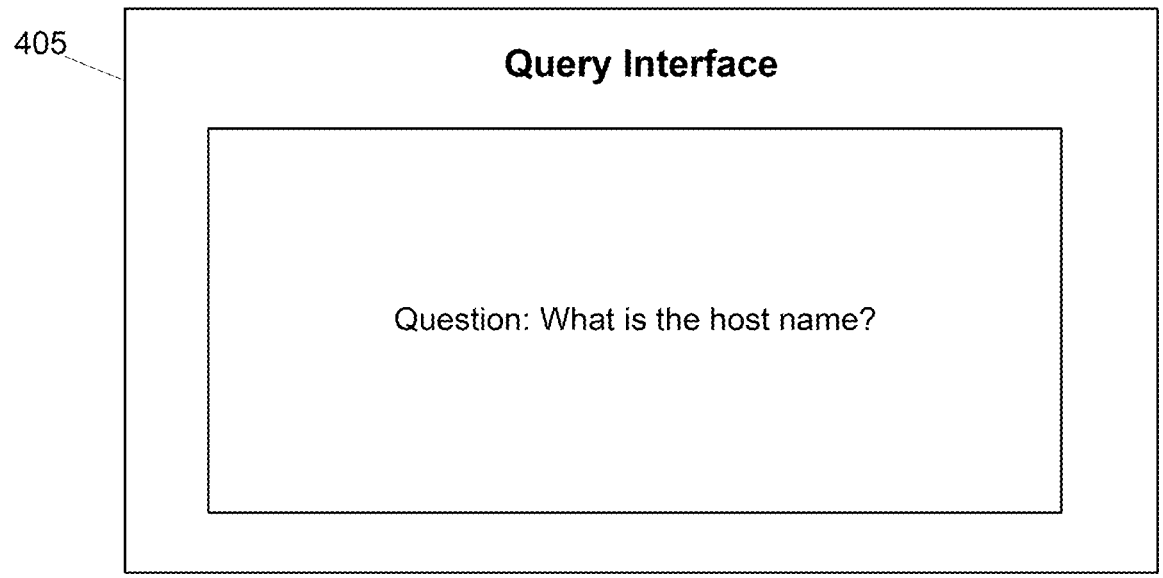
FIGS. 4 and 5 depict illustrative graphical user interfaces/notifications associated with improved query and/or command processing in accordance with one or more example embodiments.

At step 203, the enterprise user device 103 may send a request to the universal intelli-shell platform 102. For example, the enterprise user device 103 may receive a query, command, and/or other request via a user interface of the enterprise user device 103 (which may, e.g., be similar to the graphical user interface 405, depicted in FIG. 4). For example, the enterprise user device may be connecting to an operating system or database instance, and may be interacting with a corresponding specific interface such as a shell or power shell for an operating system, or a SQL based interactive command line interface for database management systems (e.g., Oracle, SQL server, MySQL, Sybase, and/or other systems). In some instances, in sending the request, the enterprise user device 103 may send a request formatted or otherwise prepared for the specific interface with which it is interacting. For example, a user of the enterprise user device 103 may know how to draft requests, commands, queries, or the like in this specific format/language, but might not know how to prepare such requests, commands, queries, or the like in other formats/languages.

In some instances, the enterprise user device 103 may send a query, command, and/or other request in a natural language format or machine language format. For example, the enterprise user device 103 may receive the query, command, and/or other request from an individual capable of drafting queries, commands, and/or other requests in a particular machine language format but not others. Alternatively, the enterprise user device 103 may receive the query command, and/or other request from an individual capable of drafting queries, commands, and/or other requests in a natural language format, but not a machine language format (e.g., the individual might not have programming experience or knowledge). In some instances, the enterprise user device 103 may send the query, command, and/or other request to the universal intelli-shell platform 102 while the first wireless data connection is established. Particular examples of the query, command, and/or other request may be "what is the host name," "connect to Oracle ProdODS," "drop the temporary view OBSO," "get me top 50 records of table T_CUST," "find number of indexes in reporting database," and/or other requests.

At step 204, the universal intelli-shell platform 102 may receive the query, command, and/or other request sent at step 203. For example, the universal intelli-shell platform 102 may receive this request via the communication interface 113 and while the first wireless data connection is established.

At step 205, the universal intelli-shell platform 102 may input the query, command, and/or request received at step 204 into a universal parser, which may, e.g., include the natural syntactic language processor 112a and the decision engine 112b.

Figure 2B:
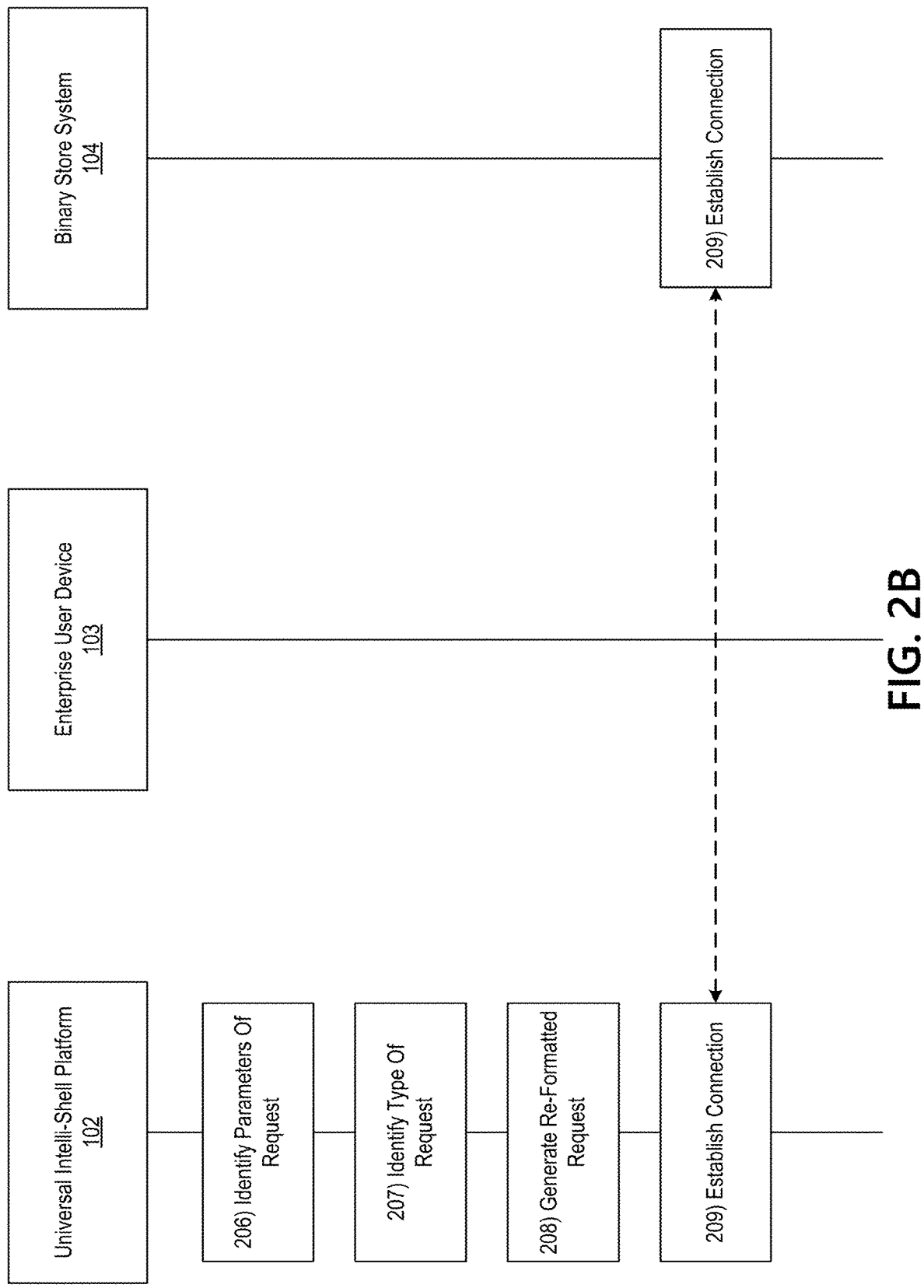

Referring to FIG. 2B, at step 206, the universal intelli-shell platform 102 may feed the received query, commands, and/or other request into the natural syntactic language processor 112a. For example, the universal intelli-shell platform 102 may use the natural syntactic language processor 112a to identify and/or otherwise extract one or more parameters (e.g., parts of speech, named entities, basic dependencies, enhanced dependencies, and/or other parameters) from the query, commands, and/or other request using supervised learning analysis. For example, the universal intelli-shell platform 102 may construct a parse tree based on the received query, commands, and/or other request, and may extract the one or more parameters according to the parse tree.

For example, in the example where the request is "drop the temporary view OBSO," the natural syntactic language processor 112a may identify that "temporary" is an adjective, "drop" is a verb, "view" and "OBSO" are singular nouns, and "the" is a determiner. In some instances, in identifying these parts of speech, the natural syntactic language processor 112a may tag the words with their corresponding part of speech label (e.g., adjective="JJ," verb="V," singular noun="NN," determiner="DT," and/or other labels). In continuing with this example, the natural syntactic language processor 112a may identify "OBSO" as an organization and tag it as such. In addition, the natural syntactic language processor 112a may tag a dependency between "drop" and "OBSO," the compound nature of "view" and "OBSO," the deterministic nature of "OBSO" on "the," and/or other basic/enhanced dependencies. In doing so, the natural syntactic language processor 112a may determine the syntax/semantics of the received query, commands, and/or other request by determining an n-gram based on the identified parameters.

At step 207, after identifying, extracting, and/or otherwise flagging the parameters of the query, commands, and/or request at step 206, the universal intelli-shell platform 102 may input these parameters into the decision engine 112b to determine a type of the request (e.g., is it a database query/command, operating system query/command, and/or other query command). For example, the decision engine 112b may use unsupervised learning to identify the type of the request. Specifically, the decision engine 112b may input the parameters into a clustering model to identify the type of the request based on concentrations and/or other associations of the parameters. In addition or as an alternative to identifying whether the query/command is for a database or an operating system, the decision engine 112b may identify a type of operating system or database (e.g., Linux, DOS, Mongo, and/or other type), a type of machine language (e.g., Oracle, SQL, MYSQL, MongoDB, and/or other language), and/or other features of the query, command, and/or request.

At step 208, the universal intelli-shell platform 102 may feed the parameters and type of request, identified at steps 206 and 207, into the mapping catalogue 112c. Based on the parameters and type of request, the universal intelli-shell platform 102 may use the mapping catalogue 112c to identify a corresponding binary store (e.g., binary store system 104) that may be used to satisfy the query, commands, and/or request and a format of that binary store. The universal intelli-shell platform 102 may then use the mapping catalogue 112c to identify an output (e.g., output commands, query, and/or other request) formatted for execution on the binary store system 104. For example, the binary store system 104 may include data formatted in a second format (e.g., a second machine language), different from a first format (e.g., a first machine language or natural language) of the input query, commands, and/or request received at step 204. In some instances, once the output query, commands, and/or request has been identified, the universal intelli-shell platform 102 may use key value pairs to input the parameters, identified at step 206, into the output. For example, the mapping catalogue 112c may store relationships between parameters, command types, and output commands, and may be configured to provide an output based on this stored information and an input.

In short, the mapping catalogue 112c may use the type of request, query, and/or commands identified at step 207 to identify an appropriate binary store system 104 to satisfy the request, query, or commands, and may identify a corresponding format for the output request, query, and/or commands. The mapping catalogue 112c may then input the parameters, identified at step 206, into the output request, query, and/or commands to produce an output request query, and/or commands formatted for execution on the appropriate binary store system 104 and that corresponds to the intent of the initial input request, query, and/or commands received from the enterprise user device 103. In doing so, the universal intelli-shell platform 102 may effectively translate the request, query, and/or commands from a first format (e.g., used by the enterprise user device 103 to compose the input request, query, and/or commands), which might not be executable on the binary store system 104, to a second format, which may correspond and/or otherwise be executable on the binary store system 104.

At step 209, the universal intelli-shell platform 102 may establish a connection with the binary store system 104. For example, the universal intelli-shell platform 102 may establish a second wireless data connection with the binary store system 104 to link the universal intelli-shell platform 102 to the binary store system 104 (e.g., in preparation for executing the output/reformatted query, commands, and/or other request). In some instances, the universal intelli-shell platform 102 may identify whether a connection is already established with the binary store system 104. If a connection is already established with the binary store system 104, the universal intelli-shell platform 102 might not re-establish the connection. If a connection is not yet established with the binary store system 104, the universal intelli-shell platform 102 may establish the second wireless data connection as described herein.

Figure 2C:
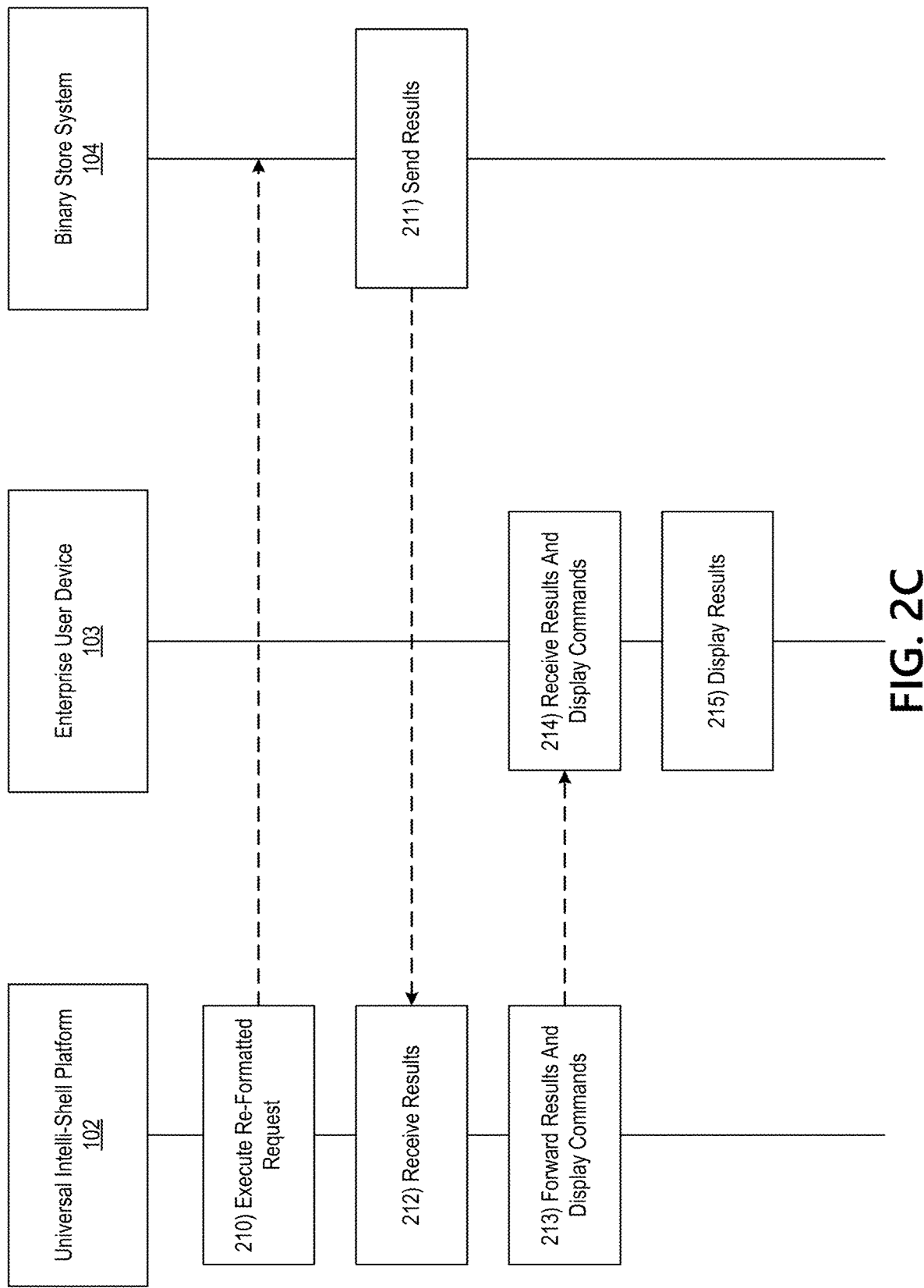

Referring to FIG. 2C, at step 210, the universal intelli-shell platform 102 may execute the output/reformatted query, commands, and/or other request on the binary store system 104. For example, the universal intelli-shell platform 102 may communicate with the binary store system 104 via the communication interface 113 and while the second wireless data connection is established to do so. In some instances, in executing the output/reformatted query, commands, and/or other request, the universal intelli-shell platform 102 may execute an output/reformatted query, commands, and/or other request formatted according to a machine language of the binary store system 104 (which may e.g., be different than a machine language or natural language of the input query/commands/request received at step 204). In some instances, the universal intelli-shell platform 102 may select the appropriate binary store system 104 of a plurality of binary store systems 104 (which may, e.g., correspond to different database layers such as Oracle, MySQL, Sybase, Postgres, MSSQL, Mongo, and/or other layers).

At step 211, the binary store system 104 may identify results corresponding to the output/reformatted query, commands, and/or other request, and may send the results to the universal intelli-shell platform 102. In some instances, the binary store system 104 may send the results to the binary store system 104 while the second wireless data connection is established.

At step 212, the universal intelli-shell platform 102 may receive the results sent at step 211. For example, the universal intelli-shell platform 102 may receive the results via the communication interface 113 and while the second wireless data connection is established.

At step 213, the universal intelli-shell platform 102 may forward the results to the enterprise user device 103. For example, the universal intelli-shell platform 102 may forward the results to the enterprise user device 103 via the communication interface 113 and while the first wireless data connection is established. In some instances, the universal intelli-shell platform 102 may also send one or more commands directing the enterprise user device 103 to display the results.

At step 214, the enterprise user device 103 may receive the results sent at step 213. For example, the enterprise user device 103 may receive the results while the first wireless data connection is established. In some instances, the enterprise user device 103 may also receive the one or more commands directing the enterprise user device 103 to display the results.

Figure 5:
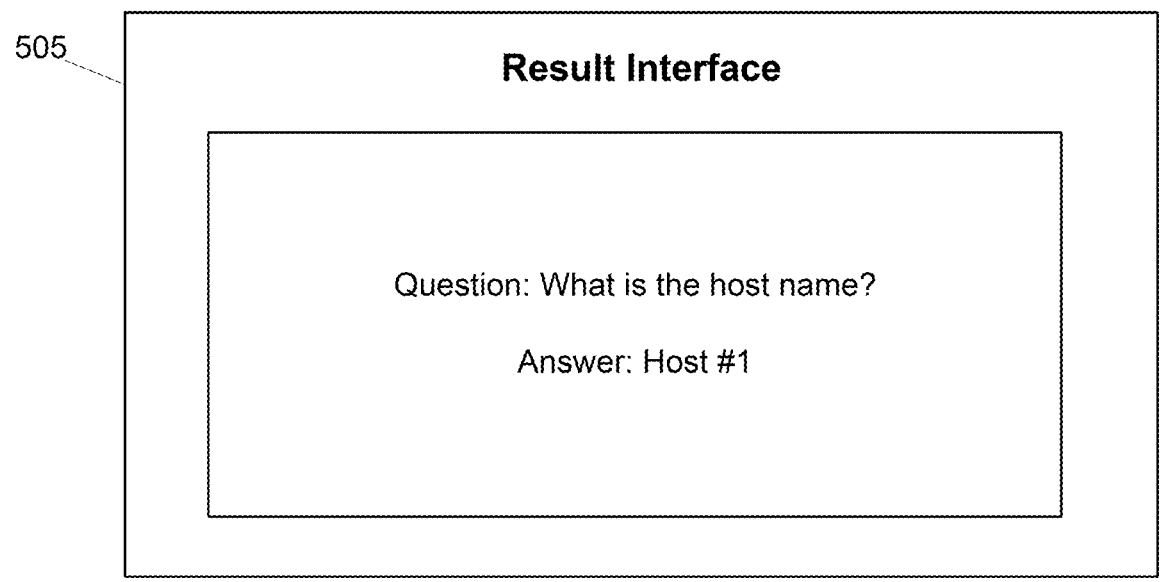

At step 215, based on or in response to the one or more commands directing the enterprise user device 103 to display the results, the enterprise user device 103 may display the results. For example, the enterprise user device 103 may display a graphical user interface similar to graphical user interface 505, which is shown in FIG. 5.

Figure 2D:
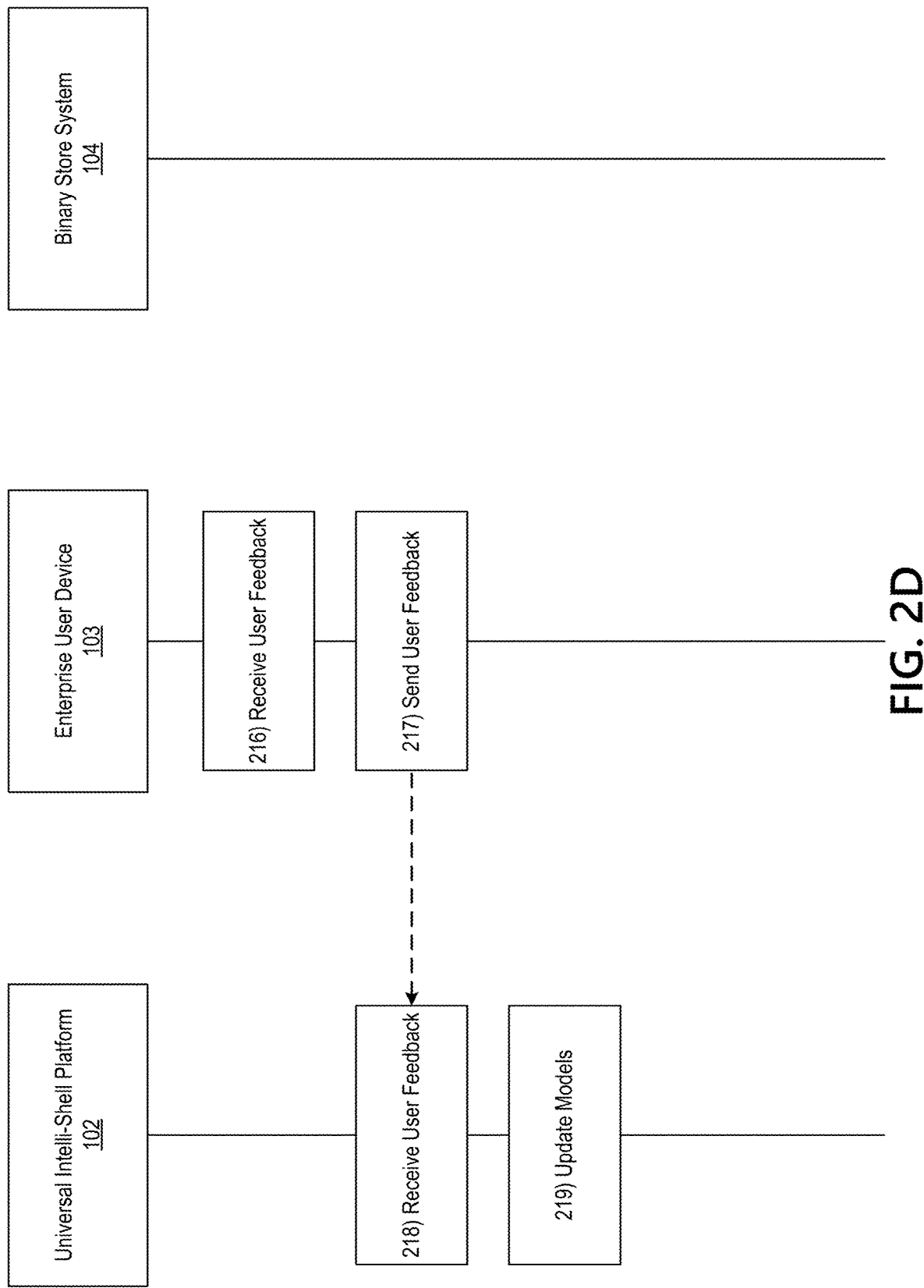

Referring to FIG. 2D, at step 216, the enterprise user device 103 may receive user feedback. For example, the enterprise user device 103 may receive feedback indicating whether or not the results are correct, whether the request type was correctly identified, whether the parameters were correctly identified, and/or other information.

At step 217, the enterprise user device 103 may send the user feedback to the universal intelli-shell platform 102. For example, the enterprise user device 103 may send the user feedback to the universal intelli-shell platform 102 while the first wireless data connection is established.

At step 218, the universal intelli-shell platform 102 may receive the user feedback sent at step 217. For example, the universal intelli-shell platform 102 may receive the user feedback via the communication interface and while the first wireless data connection is established.

At step 219, the universal intelli-shell platform 102 may dynamically update or otherwise refine the natural syntactic language processor 112a and/or the decision engine 112b based on the user feedback. In doing so, the universal intelli-shell platform 102 may dynamically improve query/command processing by enhancing the accuracy of the above described query/command translation process through continuous updating based on user feedback.

By operating in this way, the query, commands, or other request may be formatted or otherwise composed by the user of the enterprise user device 103 in any format and executed against the appropriate binary store accordingly. Accordingly, various binary stores (e.g., of different formats) may be effectively be introduced into the universal technology stack, and requests may be processed accordingly. Furthermore, time needed for enterprise users to come up to speed on all implemented command line/database interfaces may be eliminated, which may improve efficiency and reduce costs.

Figure 3:
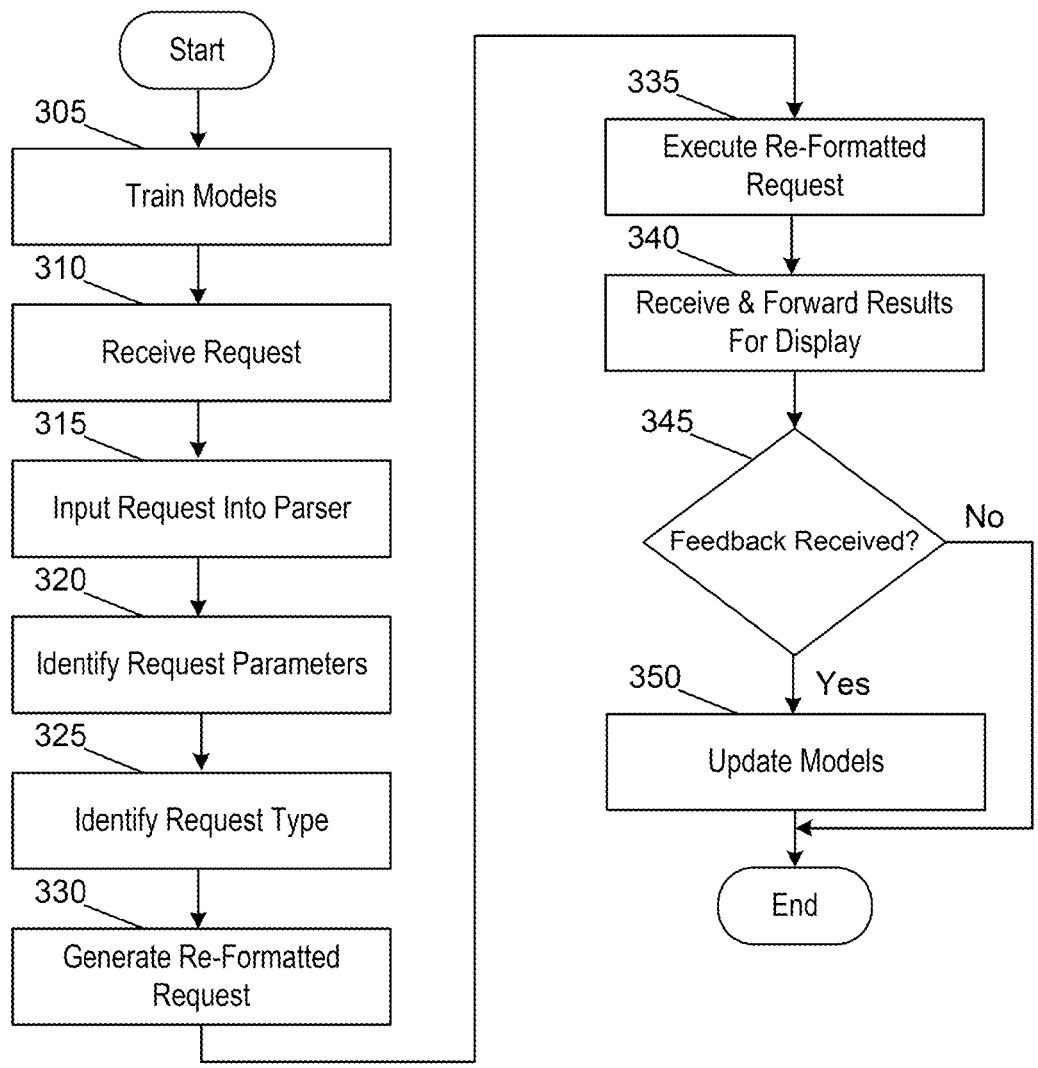
FIG. 3 depicts an illustrative method for improved query and/or command processing in accordance with one or more example embodiments.

FIG. 3 depicts an illustrative method for improved query/command processing in accordance with one or more example embodiments. Referring to FIG. 3, at step 305, a computing platform having at least one processor, a communication interface, and memory may train one or more machine learning models (e.g., a natural syntactic language processor and/or a decision engine). At step 310, the computing platform may receive an input query, commands, or other request from an enterprise user device. At step 315, the computing platform may input the input query, commands, or other request into a universal parser that includes the natural syntactic language processor and the decision engine. At step 320, the computing platform may identify and/or extract one or more parameters of the input query, commands, or other request. At step 325, the computing platform may identify, based on the one or more parameters, a type of query, commands, or other request. At step 330, the computing platform may generate an output query, commands, or other request based on the parameters and the type, which may be re-formatted for execution at a binary store system. At step 335, the computing platform may execute the output/re-formatted query, commands, or other request on the binary store system. At step 340, the computing platform may receive results of the output/re-formatted query, commands, or other request, and may forward the results to the enterprise user device. At step 345, the computing platform may identify whether feedback is received from the enterprise user device. If feedback is not received, the method may end. Otherwise, if feedback is received, the computing platform may proceed to step 350. At step 350, the computing platform may update the natural syntactic language processor and/or the decision engine accordingly.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      input a command input, formatted in a first format, into a natural syntactic language processor configured to extract one or more parameters from the command input;
      input the command input into a decision system configured to identify a command type of the command input;
      generate, using a mapping catalogue and based on the one or more parameters and the command type, an output command formatted in a second format;
      execute, against a binary store configured in the second format, the output command to obtain results to the command input; and
      send one or more commands directing an enterprise user device to display the results.

2. The computing platform of claim 1, wherein the command input comprises one of: a database command or an operating system (OS) command.

3. The computing platform of claim 1, wherein the memory stores additional computer-readable instructions that, when executed by the at least one processor, cause the computing platform to:
   train the natural syntactic language processor by training a supervised machine learning model using a plurality of natural language commands for a database and an operating system.

4. The computing platform of claim 1, wherein the memory stores additional computer-readable instructions that, when executed by the at least one processor, cause the computing platform to:
   train the decision system using unsupervised learning.

5. The computing platform of claim 1, wherein the mapping catalogue includes relationships between parameters, command types, and output commands.

6. The computing platform of claim 1, wherein the first format comprises a first machine language and the second format comprises a second machine language.

7. The computing platform of claim 1, wherein the first format comprises a natural language and the second format comprises a machine language.

8. The computing platform of claim 1, wherein the memory stores additional computer-readable instructions that, when executed by the at least one processor, cause the computing platform to:
   receive, from the enterprise user device, feedback indicating whether the output command is accurate based on the command input; and
   update, based on the feedback, one or more of: the natural syntactic language processor and the decision system.

9. The computing platform of claim 1, wherein the one or more parameters comprise one or more of: parts of speech, named entities, basic dependencies, and enhanced dependencies.

10. The computing platform of claim 1, wherein the decision system identifies the command type of the command input by inputting the one or more parameters into a clustering model.

11. The computing platform of claim 1, wherein the memory stores additional computer-readable instructions that, when executed by the at least one processor, cause the computing platform to:
   receive, from an enterprise user device, the command input configured in the first format.

12. The computing platform of claim 1, wherein sending the one or more commands directing the enterprise user device to display the results causes the enterprise user device to display the results.

13. A method comprising:
   at a computing platform comprising at least one processor, a communication interface, and memory:
      inputting a command input, configured in a first format, into a natural syntactic language processor configured to extract one or more parameters from the command input;
      inputting the command input into a decision system configured to identify a command type of the command input;
      generating, using a mapping catalogue and based on the one or more parameters and the command type, an output command formatted in a second format;
      executing, against a binary store configured in the second format, the output command to obtain results to the command input; and
      sending one or more commands directing an enterprise user device to display the results.

14. The method of claim 13, wherein the command input comprises one of: a database command or an operating system (OS) command.

15. The method of claim 13, further comprising:
training the natural syntactic language processor by training a supervised machine learning model using a plurality of natural language commands for a database and an operating system.

16. The method of claim 13, further comprising:
training the decision system using unsupervised learning.

17. The method of claim 13, wherein the mapping catalogue includes relationships between parameters, command types, and output commands.

18. The method of claim 13, wherein the first format comprises a first machine language and the second format comprises a second machine language.

19. The method of claim 13, wherein the first format comprises a natural language and the second format comprises a machine language.

20. One or more non-transitory computer-readable media storing instructions that, when executed by a computing platform comprising at least one processor, a communication interface, and memory, cause the computing platform to:
input a command input, formatted in a first format, into a natural syntactic language processor configured to extract one or more parameters from the command input;
input the command input into a decision system configured to identify a command type of the command input;
generate, using a mapping catalogue and based on the one or more parameters and the command type, an output command formatted in a second format;
execute, against a binary store configured in the second format, the output command to obtain results to the command input; and
send one or more commands directing an enterprise user device to display the results.

* * * * *